United States Patent

[11] 3,536,181

| [72] | Inventor | Gary A. Messerly<br>York, Pennsylvania |
|---|---|---|
| [21] | Appl. No. | 870,924 |
| [22] | Filed | Sept. 8, 1969<br>Division of Ser. No. 710,480 Mar. 5, 1968,<br>now Patent No. 3,593,095. |
| [45] | Patented | Oct. 27, 1970 |
| [73] | Assignee | By mesne assignments to,<br>Teledyne, Inc.<br>Los Angeles, California<br>a corporation of Delaware |

[54] PAN TRANSFER CONVEYOR SYSTEM
3 Claims, 11 Drawing Figs.

[52] U.S. Cl. .................................................. 198/34
[51] Int. Cl. .................................................. B65g 47/26
[50] Field of Search .......................................... 198/20, 34,
78—79; 193/32

[56] References Cited
UNITED STATES PATENTS
3,486,602 12/1969 Zuercher.................... 198/34X Primary Examiner—Edward A. Sroka
Attorney—Otto Moeller ABSTRACT: An intersection conveying system including a main continuously traveling conveyor to which articles are delivered intermittently from a first preliminary processing station for conveyance of the articles in spaced relation to a final processing station and an intersecting article transfer apparatus including a continuously traveling conveyor intersecting and lying athwart the main conveyor leading from a second preliminary processing station having controlled gating means for releasing articles to the main conveyor into the spaces between successive articles being conveyed along said main conveyor from the first preliminary processing station.

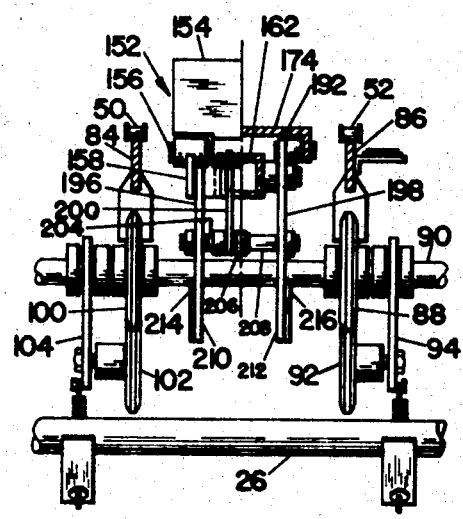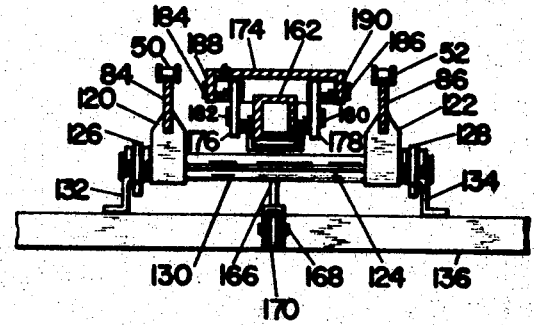
FIG. 4
FIG. 5
FIG. 1
FIG. 7
INVENTOR.
GARY A. MESSERLY
By Otto Moeller Patented Oct. 27, 1970

INVENTOR.
GARY A. MESSERLY

By Otto Moeller

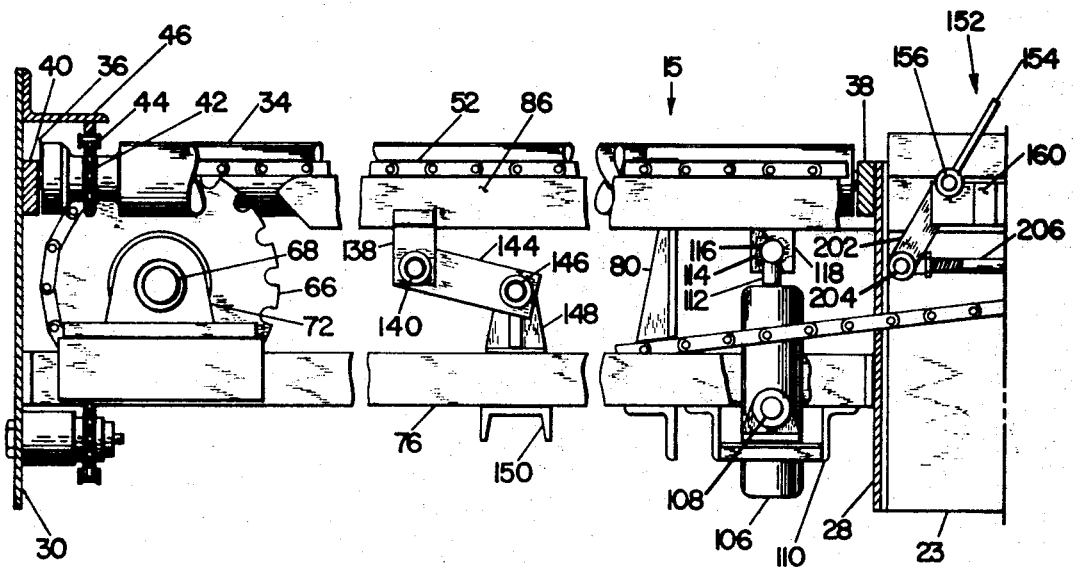
FIG. 3-A
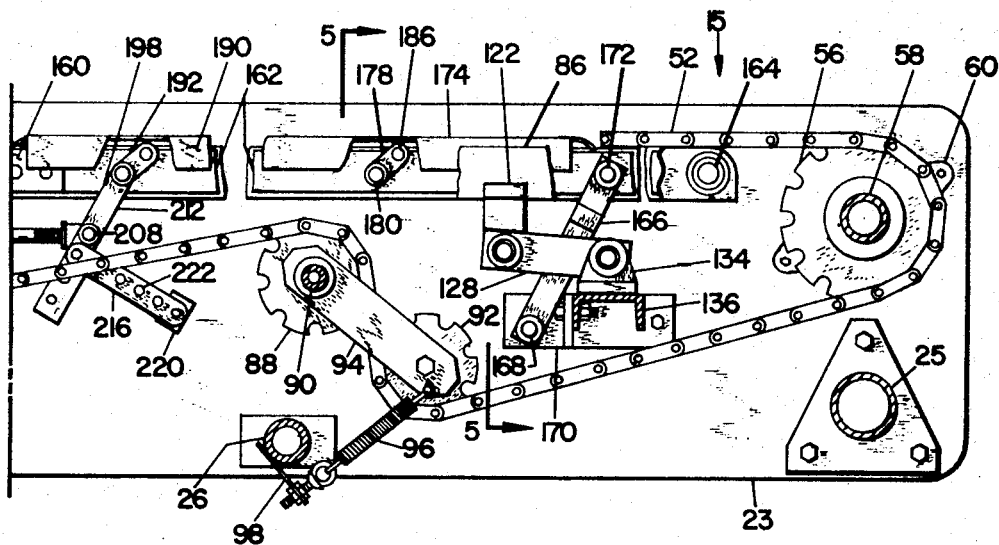
FIG. 3-B
INVENTOR.
GARY A. MESSERLY
By Otto Moeller

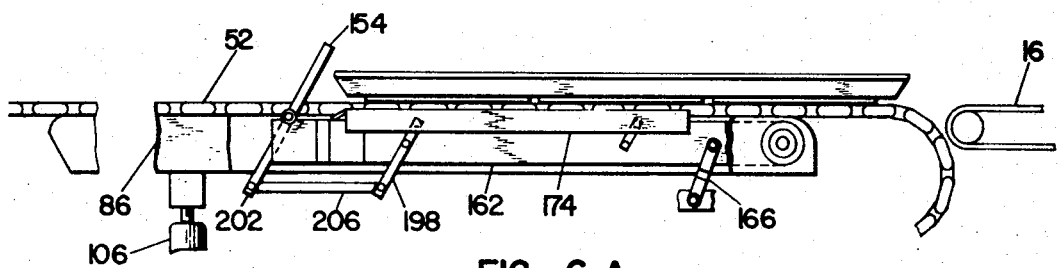
FIG. 6-A
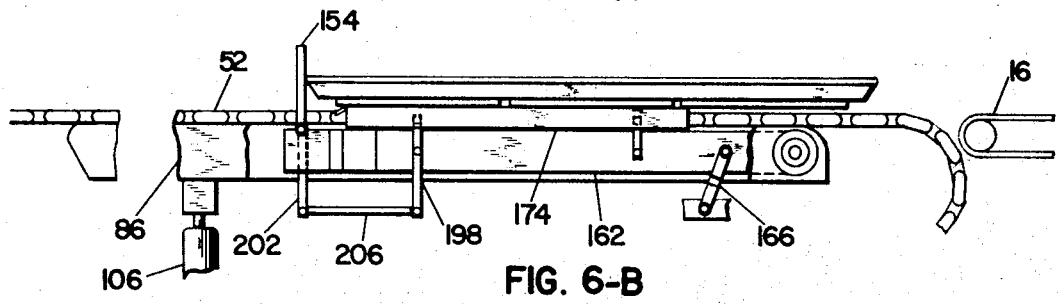
FIG. 6-B
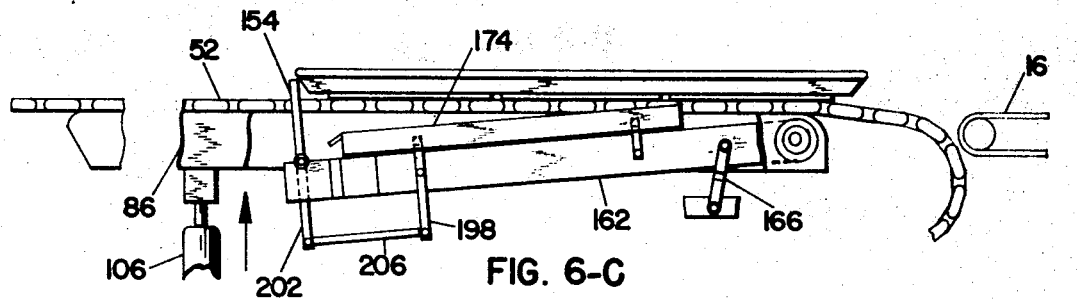
FIG. 6-C
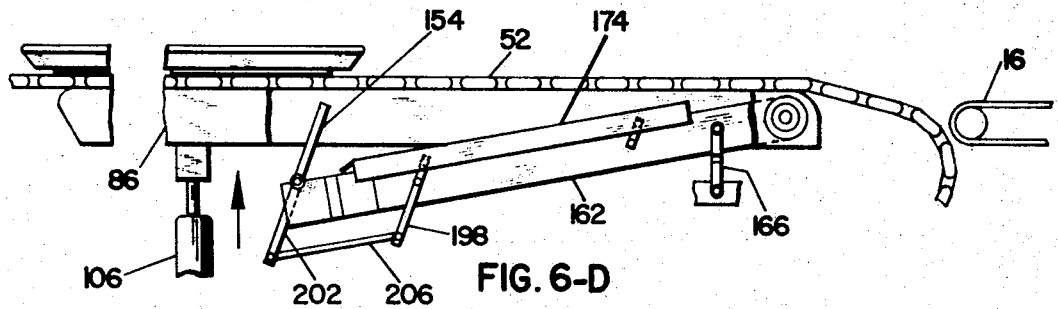
FIG. 6-D
*INVENTOR.*
GARY A. MESSERLY
By Otto Moeller

PAN TRANSFER CONVEYOR SYSTEM

BACKGROUND OF THE INVENTION

This is a division of application Ser. No. 710,480, filed March 5, 1968. In automated commercial bakeries, in the mass production for example of hamburger, frankfurter and other types of buns, the dough pieces are molded and automatically deposited in pans at what is commonly referred to as a makeup station. Such bun pans are rectangular in shape and the bottoms are provided with a plurality of shallow depressions arranged in transversely and longitudinally spaced rows. The pans are moved through the makeup station on a continuously traveling feeder conveyor, being arrested thereon by well-known gating means to permit the dough pieces to be deposited in the bun pan depressions and then released. The feeder conveyor delivers the now spaced pans onto a continuously traveling main conveyor for conveyance to a conventional proofer in which under controlled conditions of temperature and humidity the dough pieces are proofed, ready for baking. Such proofers have a capacity for handling a greater number of pans of dough than can be delivered from one makeup station, and the present invention relates to a pan conveyor transfer intersection including a continuously traveling conveyor whereby pans of dough delivered thereto from the feeder conveyor of a second makeup station are transferred onto the continuously traveling main conveyor in the spaces between the pans being conveyed through the intersection so that twice as many pans of dough can be delivered by the main conveyor to the proofer per unit of time.

SUMMARY OF THE INVENTION

In a conveying system of the type described above, since pans of dough are being continuously moved through the intersection in described spaced relation on the continuously traveling main conveyor, it is essential that pans of dough be delivered by the pan intersection transfer apparatus onto the main conveyor in the spaces between successive pans passing through the intersection without causing collision of the pans, and to this end the invention provides means for automatically arresting pans on the continuously traveling conveyor of the pan intersection transfer apparatus and releasing them at the appropriate time for insertion into the spaces between successive pans passing through the intersection on the continuously traveling main conveyor.

It is another object to provide a pan intersection transfer apparatus such as described above, in which the conveyor change deposits the pans onto the main conveyor in the same position in which they are advanced by the pan intersection transfer conveyor, so that they are transversely conveyed by the main conveyor without change in their orientation.

As previously explained, the pans of dough advanced by the continuously traveling conveyor of the pan intersection transfer apparatus are arrested and released at the appropriate time for insertion in the spaces between successive pans passing through the intersection on the main conveyor. Since the pans on the main conveyor are traveling continuously, the conveyor of the pan intersection transfer apparatus operates at a comparatively high rate of speed to insure insertion of a pan without colliding with or being struck by an oncoming pan on the main conveyor. Because of the shallow depressions of the bun pans in which the dough pieces have been deposited, impact of the pans upon being arrested causes the dough pieces to be dislocated from their positions in the depressions. It is therefore another object of the invention to minimize such dislocation of the dough pieces and for this purpose movable platform means is provided for raising the bun pans from the rapidly moving conveyor of the intersection transfer apparatus shortly before they arrive at their arrested position, so that their momentum has been sufficiently decelerated when reaching their arrested position to minimize such dislocation of the dough pieces. A related object is to provide means whereby raising of the platform is controlled by the pan arrest- As previously pointed out, the conveyor of the pan intersection transfer apparatus operates at a comparatively high speed in order to insure insertion of pans in the spaces between the pans that are being continuously advanced through the intersection by the main conveyor. However, since the pan on the high-speed conveyor is arrested for a substantial length of time before being released, the feeder conveyor from the makeup station can and does operate at a considerably lower speed. It is therefore another object to provide a pan intersection transfer apparatus constructed and arranged so that when a pan is arrested on the high-speed conveyor, a following pan on the feeder conveyor is incapable of being moved sufficiently onto the high-speed conveyor to be conveyed thereby, whereby impact of a following pan with a pan arrested on the high speed conveyor is minimized.

Other objects and advantages of the invention will be hereinafter pointed out or will become apparent from the following description when read in conjunction with the accompanying drawings.

BRIEF DESCRIPTION OF THE DRAWINGS

FIG. 1 is a somewhat diagrammatic view in plan of the pan intersection transfer apparatus for transferring pans from one processing station to a main conveyor along which pans received from another processing station are being continuously advanced in spaced relation through the intersection;

FIGS. 3A and 3B are sectional views taken on line 3-3 of FIG. 2;

FIG. 4 is an enlarged sectional view taken on line 4-4 of FIG. 2;

FIG. 5 is an enlarged section view taken on line 5-5 of FIG. 3B;

FIGS. 6A, 6B, 6C and 6D are diagrammatic views showing successive stages in the operation of the pan intersection transfer apparatus; and FIG. 7 is a schematic view of an electrical control system for the apparatus.

DESCRIPTION OF THE PREFERRED EMBODIMENT

Figure 2:
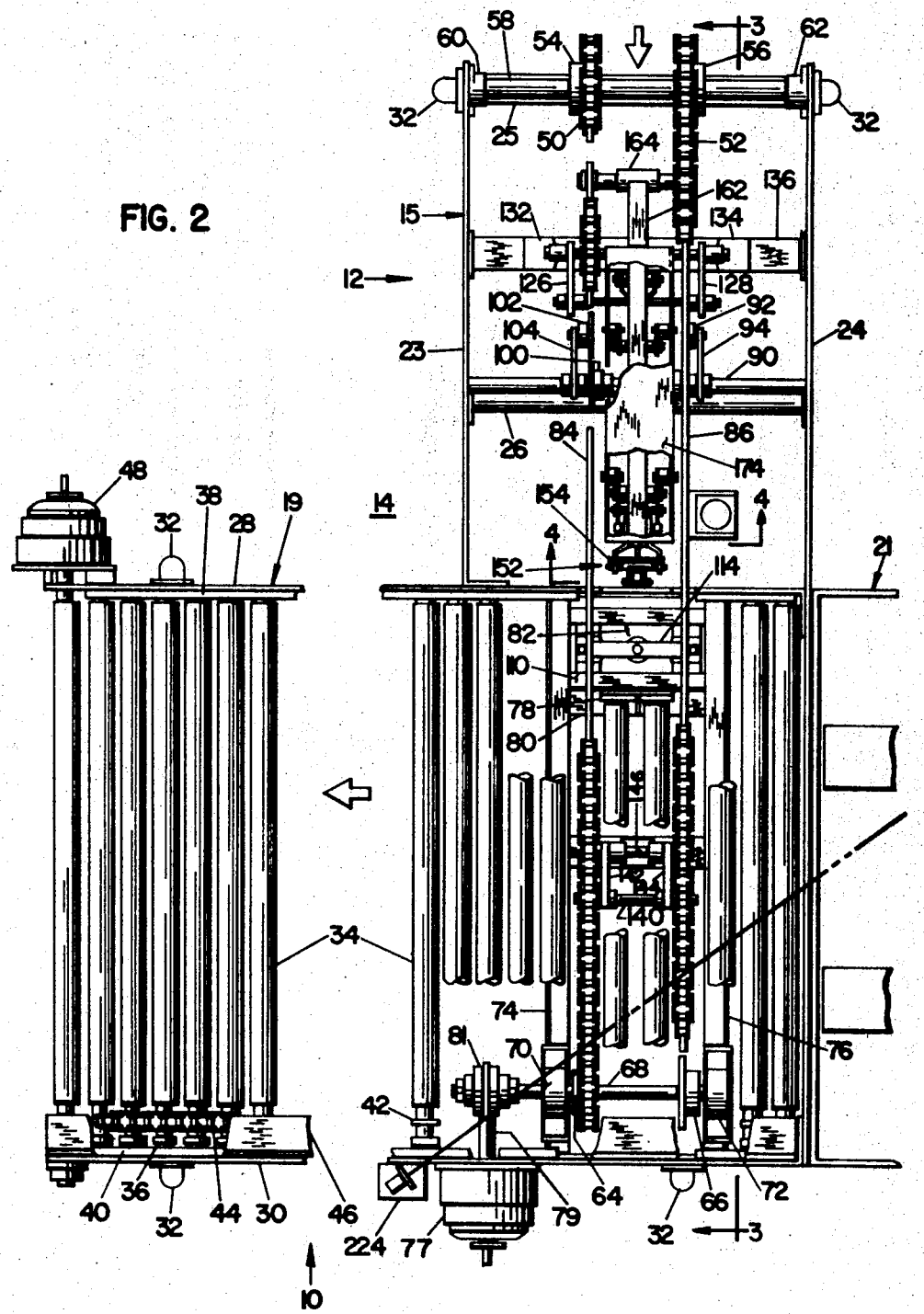
FIG. 2 is an enlarged detailed plan view of the pan intersection transfer apparatus of FIG. 1.

Referring to FIG. 1, the invention is more or less diagrammatically illustrated as incorporated in a conveying system for delivering pans of dough to a proofer. The conveying system includes a main conveying line 10 for delivering pans of dough in the direction of the arrow to the proofer and a pair of spaced feeder conveying lines 11 and 12 disposed at right angles to main conveying line 10 for delivering pans of dough in the direction of the arrows to main conveying line 10 from conventional makeup stations (not shown) where the dough pieces are formed and placed in the pans. Because of the time consumed at the forming and panning station, the pans are delivered therefrom in substantial-spaced relation and at a rate considerably less than the capacity of the proofer. To provide a more efficient operation and an increased production rate afforded by the capacity of the proofer, a plurality of forming and panning stations with a plurality of feeder conveying lines 11 and 12 are employed for delivering pans to the single main conveying line 10.

The conveying system at the corner intersection of the upstream end of main conveying line 10 and feeder conveying line 11 includes a right-angle pan transfer unit 13 that may be of any suitable type, well known in the art, for transferring the successively spaced pans from the feeder conveying line 11 to the main conveying line 10. Downstream from the right-angle pan transfer unit 13, at an intermediate intersection of the main conveying line 10 and feeder conveying line 11, the conveying system includes a novel right-angle pan transfer unit 14 constructed and arranged for controlled delivery of pans from feeder conveying line 12 to the main conveying line 10 whereby such pans are inserted into the spaces between the that are being continuously advanced along main conveying line 10. While, as stated above, the corner transfer unit 13 may be of any suitable type well known in the art, it preferably embodies features of the intermediate transfer unit 14 to which reference will be made in the course of the following description.

The intermediate pan transfer unit 14 includes an inlet conveyor 15 at the upstream end of feeder conveying line 12 to which successive pans of dough are delivered from the makeup and panning station by any suitable type of conventional conveyor 16 at the downstream end of feeder conveying line 12. The corner pan transfer unit 13 preferably includes a similar inlet conveyor 17 at the upstream end of feeder conveying line 11 to which successive pans of dough are delivered from another makeup and panning station by a conventional conveyor 18 at the downstream end of feeder conveying line 11.

The intermediate pan transfer unit 14 also includes an outlet conveyor 19 lying athwart the downstream end of the inlet conveyor 15 for receiving successive pans of dough therefrom. The corner pan transfer unit 13 similarly includes an outlet conveyor 20 lying athwart the downstream end of the inlet conveyor 17 for receiving successive pans of dough therefrom. The outlet conveyors 19 and 20 form sections of the main conveying line 10, which also includes any suitable conventional type of conveyor 21 between outlet conveyors 19 and 20 and any suitable conventional type of conveyor 22 leading from outlet conveyor 19 to the proofer.

Referring particularly to FIG. 2, the inlet conveyor 15 of the pan transfer unit 14 includes laterally spaced supporting frame members 23 and 24 connected by suitable end and intermediate spacer members 25 and 26, and the outlet conveyor 19 of the pan transfer unit 14 includes laterally spaced supporting frame members 28 and 30 connected by suitable spacer members, not shown. Fittings 32 secured to the various frame members are adapted to support the pan transfer unit 14 a desired distance above the floor.

The outlet conveyor 19 is preferably in the form of a powered roll conveyor including a plurality of transversely extending longitudinally spaced rolls 34 having reduced end portions 36 journaled in longitudinally extending roll mounts 38 and 40 secured respectively to side frame members 28 and 30. The reduced roll end portions 36 adjacent the roll mount 40 have sprockets 42 keyed thereon around which is trained an endless drivechain 44. A longitudinally extending holddown angle member 46 rigidly secured in suitable manner to the inner side of the frame member 30 projects inwardly therefrom in overlying relation to the top run of the chain 44 to maintain the chain 44 in driving relation with the roll sprockets 42. Suitable drive means 48 supported by side frame member 28 operatively connected with the end one of the rolls 34 drives all the rolls through the endless chain 44 and sprockets 42.

The inlet conveyor 15 includes a pair of longitudinally extending laterally spaced endless chain conveyors 50 and 52 trained over sprockets 54 and 56 fixed on a transversely extending shaft 58 rotatably mounted in bearings 60 and 62 carried by the side frame members 23 and 24 of the inlet conveyor 15 at the upstream end thereof; and trained over sprockets 64 and 66 fixed on a transversely extending shaft 68 rotatably mounted in bearings 70 and 72 supported adjacent the side frame 30 of the outlet conveyor 19 on struts 74 and 76 extending between side frame members 28 and 30. The chain conveyors are continuously driven from a motor and reduction gear unit 77 suitably mounted on the frame member 30, the output shaft 79 of which is connected with an extension of shaft 68 by gearing 81. The roll mount 38 is cut away and the side frame member 28 is suitably recessed to permit the chain conveyors 50 and 52 to pass freely therethrough and certain of the rolls 34 are spaced a sufficient distance apart to freely accommodate the upper runs of the chain conveyors 50 and 52 therebetween. The two rolls 34 disposed between the chain rolls 34 and are journaled in a roll mount 78 supported by a bracket 80 secured at its ends to the struts 74 and 76 providing a space 82 between the roll mount 78 and the plane of the roll mount 38 for a purpose to be later described. The above described means for mounting the chain conveyors 50 and 52 are arranged so that the upper runs thereof are normally disposed in a horizontal plane slightly below the horizontal plane of the supporting surface of the rolls 34.

In order to transfer a pan from the inlet conveyor 15 to the outlet conveyor 19, a pair of longitudinally extending chain lift rails 84 and 86 are disposed respectively in underlying engagement with the upper run of respective chains 50 and 52 of the inlet conveyor 15. As best shown in FIGS. 3A, 3B, the chain lift rail 86 terminates at its ends just short of the sprockets 56 and 66 over which the chain conveyor 52 is trained, it being understood that chain lift rail 84 is similarly disposed with respect to sprockets 54 and 64. Means, hereinafter described in detail, is provided for periodically raising the chain lift rails 84 and 86 to elevate the top runs of the chains 50 and 52 from their previously described normal position slightly below the plane of the pan-supporting surface of the rollers 34 to a position slightly above such plane whereby a pan is advanced by the chains 50 and 52 to a position above the rollers 34; and for periodically lowering the chain lift rails 84 and 86 to permit return of the upper runs of the chains 50 and 52 from their elevated position to their normal lowered position to deposit the pan on the rollers 34 for conveyance thereby.

To permit the upper runs of the chains 50 and 52 to be raised and lowered, above and below the plane of the rolls 34, the lower runs thereof are provided with yieldable chain-tensioning means. Referring particularly to FIGS. 3A, 3B, the lower run of chain 52 is trained over a sprocket 88 rotatably mounted on a transversely extending shaft 90 secured at its ends to side frame members 23 and 24, and also trained under a downwardly and rearwardly offset sprocket 92 rotatably supported at one end of a lever 94, the other end of which lever 94 is rotatably supported on the shaft 90. A coil spring 96 is attached at one end to the free end of the lever 94 and at its other end is attached to a downwardly and forwardly offset adjustable spring tension mounting 98 secured to the intermediate spacer member 26 connecting the side frame members 23 and 24 of the inlet conveyor 15. When the upper run of the chain 52 is elevated upon raising of the chain lift rail 86, it will be seen that the sprocket 92 is bodily swingable in a counterclockwise direction, as viewed in FIG. 3B, about the axis of the sprocket 88 against the tension of spring 96 to provide the necessary additional length of chain in the upper run. The weight of the sprocket 92 in addition to the tension of spring 96 takes up the slack in the upper run of chain 52 upon lowering of the chain lift rail 86, so that it returns to its normal lowered position. It is understood that a similar arrangement is provided for the chain 50, there being shown in FIGS. 2 and 4 a sprocket 100 corresponding to sprocket 88, a sprocket 102 corresponding to sprocket 92 and a lever 104 corresponding to lever 94.

The means for raising and lowering the chain lift rails 84 and 86 includes an air cylinder 106 disposed below the chain lift rails 84 and 86 midway therebetween in the previously referred to space 82. The cylinder 106 is mounted near its lower end for pivotal movement about a transversely extending axis, as best shown at 108 in FIG. 3A, the pivotal mounting being supported on a bracket 110 rigidly fixed to and spanning the struts 74 and 76. The free end of the cylinder piston stem 112 is secured to a lift bar 114 provided at its ends with pins 116 rotatably mounted in lugs 118 rigidly secured, as by welding, to the under side of the chain lift rails 84 and 86.

In order to restrain forward movement of the chain lift rails 84 and 86 and yet permit raising thereof by the air cylinder 106 to elevate the chains 50 and 52 slightly above the level of the rollers 34, as previously described, the rails 84 and 86 near their rearward or upstream ends have rigidly secured thereto depending lugs 120 and 122, as best shown in FIGS. 3B and 5.

tending shaft 124 on the projecting ends of which are pivotally mounted one end of links 126 and 128. The other end of links 126 and 128 are pivotally mounted on a transversely extending shaft 130 rotatably mounted in bearings 132 and 134 offset rearwardly of and slightly below the mounting of the first-mentioned end of links 126 and 128, the bearings 132 and 134 being supported on a channel member 136 secured at its ends to plates 23 and 24. Near their forward or downstream ends, each of the rails 84 and 86 has a depending lug rigidly secured thereto, the lug 138 for the rail 86 being shown in FIG. 3A. Extending through the rail lugs 138 is a transversely extending shaft 140 on which, inwardly of rail lugs 138, are pivotally mounted one end of links 142 and 144, see FIGS. 2 and 3A. The other end of links 142 and 144 are pivotally mounted on opposite ends of a transversely extending shaft 146, rotatably mounted in a bearing 148 offset rearwardly of and slightly below the mounting of the first-mentioned end of links 142 and 144, the bearing 148 being supported on a channel member 150 secured at its ends to the struts 74 and 76.

Associated with the pan-advancing chain conveyors 50 and 52 is an escapement means 152 for releasing pans to be transferred to the roller bed outlet conveyor 19 one at a time. The escapement means 152 includes a gate 154 which, when the upper runs of chain conveyors 50 and 52 are in their normal lowered position, is disposed in the path of a pan being conveyed to intercept the same; and which, when the upper runs of chain conveyors 50 and 52 have been elevated upon raising of the rails 84 and 86 by the air cylinder 106 as previously described, is disposed below such path to permit the pan to pass to a position over the roller bed conveyor 19. The gate 154 is pivotally mounted on a transversely extending shaft 156 supported at its ends in brackets 158 and 160 secured to and extending forwardly of the forward end of a longitudinally extending gate support arm 162. The rearward end of the gate support arm 162 is rigidly secured to a transversely extending trunnion 164, as best shown in FIG. 2, the ends of which are rotatably mounted in the rearward ends of the chain lift rails 84 and 86. The gate support arm 162 is normally retained in its horizontal position, as shown in FIGS. 3A and 3B, by a pivot support link 166, the lower bifurcated end of which is pivotally connected at 168, see also FIG. 5, to a bracket 170 rigidly secured to the stationary channel member 136, and the upper bifurcated end of which is pivotally connected at 172 to the gate support arm 162.

When the chain lift rails 84 and 86 are now raised by the air cylinder 106, as previously described, the gate support arm 162 swings about pivotal connection 172 as a fulcrum from its normal horizontal position, as shown in FIGS. 3A, 3B, 6A and 6B, to its downwardly sloping position as shown in FIGS. 6C and 6D, raising its rearward end which, as above described, is pivotally connected with the rearward end of the chain lift rails 84 and 86, and lowering its gate-supporting forward end. Since the pivotal connection 172 or fulcrum is, as shown, considerably closer to the rearward end of the gate-supporting arm 162 than to the forward end thereof, it is evident that a small upward movement of the rearward end of the gate-supporting arm 162 by the chain lift rails 84 and 86 effects a considerably greater downward movement of the forward end of the gate-supporting arm 162, sufficient to lower the gate 154 below the conveying surface of the chain conveyors 50 and 52 to thereby release a previously restrained pan.

In order to move a released pan into the space between two pans moving along main conveying line 10 from feeder conveying line 11 without creating an undesirably large gap between it and the first of the two pans and without colliding with the second of the two pans, the inlet conveyor 15 must operate at a high rate of speed, approximately twice the speed of the conveyor 16 leading from the makeup and panning station. One aspect of the invention contemplates means for softening the impact of the pans against the gate 154. This is particularly important in the handling of conventional low bun pans having shallow depressions in which dough pieces have been deposited for making various types of buns, such as hamburger or frankfurter buns, since too abrupt a stop of such pans causes the dough pieces to slide out of the pan depressions and become undesirably disoriented.

For this purpose an elongated sheet metal platform 174 is mounted on and in slight spaced relation above the gate arm 162. The platform 174, as best shown in FIG. 2, is disposed in spaced relation between the chain lift rails 84 and 86 and widthwise extends beyond the sides of the gate arm 162. In its longitudinal extent the platform 174 terminates at its forward or upstream end somewhat short of the gate 154 and at its rearward or downstream end terminates somewhat short of the pivotally mounted end of the gate arm 162. The platform mounting means, hereinafter described in detail, is such that in the normal horizontal position of the gate arm 162 and the normal rearwardly pivoted position of the gate 154, as best shown in FIGS. 3A, 3B and 6A, the top surface of the platform 174 is slightly below the pan-supporting surfaces of the chain conveyors 50 and 52; and such that in the normal horizontal position of the gate arm 162 and the vertically pivoted position of the gate 154 when engaged by a pan, as shown in FIG. 6B, the platform is elevated relative to the gate arm 162 to bring its top surface above the pan-supporting surfaces of the chain conveyors 50 and 52 to raise the pan from the chain conveyor pan-supporting surfaces.

The platform mounting means includes a pair of rearward links 176 and 178 pivotally mounted at one end on stub shafts 180 and 182 extending laterally outward of opposite sides of the gate arm 162 and pivotally mounted at the other end on stub shafts 184 and 186 extending laterally inward of downturned side flanges 188 and 190 of the platform 174, as best shown in FIG. 5. A pair of forward links, one of which is shown at 192 in FIGS 3B and 4, similar to links 176 and 178 except that they form arms of bell cranks 196 and 198, similarly pivotally connect the platform 174 with the gate arm 162. This linkage permits the pivotal raising and lowering of the platform 174 relative to the gate arm 162, and such relative movement is controlled by the pivotal movement of the gate 154 through linkage now to be described.

The gate 154 at its pivotal mounting on shaft 156 is provided with a pair of depending laterally spaced lever arms 200 and 202, in the lower ends of which is mounted a transversely extending shaft 204 and on which shaft is rotatably mounted one end of a turnbuckle 206. The opposite end of turnbuckle 206 is rotatably mounted on a transversely extending shaft 208 supported at its ends intermediate the ends of the depending arms 210 and 212 of the bell cranks 196 and 198. Attached to the bell crank arms 210 and 212 are rearwardly extending arms 214 and 216 on the free ends of which counterweights 218 and 220 are detachably connected to bias the gate 154 to its previously described rearwardly tilted position and to retain the platform 174 in its previously described lowered position. As best shown in FIG. 3B, the arm 216 is provided with a series of holes 222 for detachably securing the counterweight 220 thereon in any one of a number of positions to adjust the biasing force, it being understood that a similar arrangement is provided on the arm 214 for adjusting counterweight 218. The mass of the counterweights 218 and 220 and their position on the arms 214 and 216 is such as to yield to the pressure against the gate 154 of a pan being advanced by chain conveyors 50 and 52, so that as the gate 154 is moved from its rearwardly tilted to its upright position, the platform 174 is moved to its elevated position through the described linkage, thereby raising the pan from the chain conveyors 50 and 52. The platform 174 reaches its pan-elevating position as the gate 154 approaches its upright position, so that further advance of the pan is frictionally braked by sliding engagement of the pan bottom with the platform and is additionally decelerated in overcoming the biasing force exerted through the described linkage against the gate by the weight of the pan itself and the counterweights 218 and 220. It is evident that when the gate 154 has reached its pan-arresting upright position, the forward movement of the pan has been gradually decelerated to an extent minimizing impact and thereby minimizing the tendency of the bun or roll dough pieces from being displaced forwardly from their proper positions in the pans.

An important feature of the invention is the adaptability of the apparatus to handle a variety of pans that because of the materials they are made of or because of their size vary considerably in weight. Since the weight of the pan itself exerts a biasing force on the gate, as described above, it will be seen that such biasing force is automatically increased or decreased depending on the weight of the particular pan that engages the gate.

The control means for operating the cylinder 106 to raise and lower the chain lift rails 84 and 86 with consequent lowering and raising of the gate 154, for release and insertion of pans at the proper time into the spaces between the pans being conveyed along main conveying line 10 from feeder line 11, will now be described in detail.

A proximity sensor PRS is disposed a short distance upstream of the gate 154 in position for engagement by a pan conveyed by the chain conveyors 50 and 52 of the inlet conveyor 15. The distance is such as to provide sufficient time for the gate 154 to be raised from its lowered position as shown in FIG. 6D to its raised position in the path of the pan as shown in FIG. 6A when, under certain conditions which will become apparent, the gate responds to engagement of the pan with the proximity sensor PRS.

The control means also includes a photoelectric control device including a source of light 224 and a photoelectric cell 226 disposed at opposite sides of the outlet conveyor 19 of the transfer unit 14 in longitudinally offset relation for directing a light beam 228 diagonally thereacross in the path of the pans conveyed along main conveying line 10 from feeder line 11. The light source 224 and photoelectric cell 226 are located, as may best be seen by referring to FIG. 1, so that the light beam 228 will be broken by the leading edge of a pan advancing along main conveyor line 10 a substantial distance ahead of the path followed by a pan when transferred from feeder line 12 to main conveyor line 10 and will remain broken until the trailing edge of the pan has just passed the said path. As will become evident from the further description of the control system, this insures sufficient space for insertion of a pan from feeder line 12 without colliding with a pan advancing along main conveyor line 10, and permits insertion of a pan from feeder line 12 to closely follow a pan advancing along main conveyor line 10.

The control system, referring particularly to the wiring diagram FIG. 7, includes a normally open contact CRE of a relay of the previously described photoelectric eye assembly which is closed when the beam 228 is uninterrupted; and an electric valve EV which when energized effects operation of the cylinder 106 to raise the lift rails 84 and 86, hence raising chain conveyors 50 and 52 and lowering the gate 154, all as previously described.

Assume, as shown in FIG. 1, the pan A has broken the beam 228 before pan B engages and closes contact C-1 of proximity sensor PRS, then since contact CRE is open, the circuit through lines acd to the cylinder controlling electric valve EV is broken, and with electric valve EV deenergized the cylinder 106 is in its down position, so that the chain lift rails 84 and 86 are in their down position and the gate 154 is in its rearwardly tilted up position, as shown in FIG. 6A.

When pan B engages gate 154 in moving from the position shown in FIG. 6A to the position shown in FIG. 6B, movement of the gate 154 to its vertical position raises the platform relative to the lift rails 84 and 86 and raises pan B up off the continuously operating chain conveyors 50 and 52 to thereby soften the impact of the pan against the gate, as previously described. With the chain conveyors 50 and 52 in their down position, pan A can now be freely advanced by the continuously operating rollers 34 of the outlet conveyor 19. When the trailing edge of pan A has just cleared the beam 228, the photoelectric eye assembly relay causes its normally open contact CRE to close and since contact C1 of proximity sensor PRS is also closed a circuit through line acd is completed to and energizes electric valve EV to effect raising of the lift rails 84 and 86 by cylinder 106, thereby lowering the gate 154 as shown in FIGS. 6C and 6D and raising the chain conveyors 50 and 52. Pan B will now be advanced by the chain conveyors 50 and 52 over the rollers 34 of the outlet conveyor 19 of the pan transfer unit 14.

Referring to FIG. 7 it will be seen that when line acd to the electric valve EV was completed, line ab was simultaneously completed to energize control relay CRA. Energization of control relay CRA closes its contacts CRA-C1 and CRA-C2. With contact CRA-C2 closed and with a second contact C2 of proximity sensor PRS now also closed, time delay relay TDR in line e is energized. Energization of time delay relay TDR immediately closes time delay TD, thereby completing a circuit through line fcb to and holding control relay CRA energized even though the beam 228 may be broken by the leading edge of an advancing pan B or by the chain conveyors 50 and 52 causing the contact CRE of the photoelectric eye assembly relay to open. The cylinder-controlling electric valve EV thus remains energized through line fd so that the chain conveyors 50 and 52 remains in their raised position and the gate 154 remains in its lowered position. The off-time delay TD is arranged to permit pans B, regardless of length, to be advanced to a position for depositing them on the roller 34 of the outlet conveyor 19 with their trailing edges in linear alignment. The time delay for which the off-time delay TD is set starts when the trailing edge of a pan B leaves the proximity sensor PRS, thereby opening its contact PRS-C2 and deenergize time delay relay TDR. When the set time elapses, the time delay contact opens whereupon line fd to the cylinder controlling valve EV is broken, to effect lowering of the lift rails 84 and 86 by the cylinder 106, and thereby lowering the chain conveyors 50 and 52 to deposit pan B on the rollers 34 and to raise the gate 54 to stop the next B pan.

As previously stated, the corner transfer unit 13 may be of any suitable type, well known in the art, for transferring successively spaced pans from the feeder conveying line 11 to the main conveying line 10. Preferably it is similar in all respects to the transfer unit 14, except that the photoelectric eye assembly and the contact CRE of the relay controlled by the photoelectric eye assembly are omitted. Although I have disclosed an exemplary embodiment of my invention herein, it will be understood that various changes, modifications and substitutions may be incorporated in such embodiment without departing from the spirit of the invention.

I claim:

1. In a pan-conveying system, the combination of: laterally space longitudinally extending continuously operating conveyor means for conducting pans along a path;

gate means supported for movement into an elevated position in said path for arresting a pan and for movement into a lowered position out of said path for releasing a pan;

means pivotally mounting said gate on a transversely extending axis for pivotal movement in said path between a rearwardly tilted position and a vertical position;

means normally retaining said gate means in said rearwardly tilted position;

a platform disposed in the space between said conveyor means rearward of said gate means mounted for movement between an elevated position above the level of the pan-supporting surface of said conveyor means and a lowered position below the level of said pan-supporting surface of said conveyor means; and linkage means connecting said gate with said platform operative, upon movement of said gate from said rearwardly tilted position to said vertical position by engagement therewith of a pan, to raise said platform from said lowered position to said elevated position to lift said pan from said conveyor means.

2. A pan-conveying system in accordance with claim 1 wherein said pan when raised by said platform forms a counterweight yieldably resisting movement of said gate by said pan from said rearwardly tilted position to said vertical position, to decelerate forward movement of said pan as it approaches its arrested position.

3. In a pan-conveying system, the combination of:
a first continuously operating conveyor having its discharge end adjacent the receiving end of a second continuously operating conveyor;
means for operating said second conveyor at a substantially higher speed than said first conveyor;
said second conveyor having laterally spaced, longitudinally extending conveying means for conducting pans along a path;
gate means supported for movement into an elevated position in said path for arresting a pan and for movement into a lowered position out of said path for releasing a pan;
means pivotally mounting said gate for pivotal movement in said path between a rearwardly tilted position and a vertical position;
a platform disposed in the space between said conveying means rearward of said gate means mounted for movement between an elevated position above the level of the pan-supporting surface of said conveying means and a lowered position below the level of said pan-supporting surface of said conveying means;
means connecting said gate with said platform operative, upon movement of said gate from said rearwardly tilted position to said vertical position by engagement therewith of a pan, to raise said platform from said lowered position to said elevated position to lift said pan from said conveyor means to decelerate forward movement of said pan as it approaches arrested position; and
the length of said second or high speed conveyor between said gate and the receiving end thereof being such that with a pan arrested thereon against said gate, only a minor portion of a succeeding pan on said first or slow-speed conveyor can be accommodated on said second or high-speed conveyor, to thereby minimize impact of a succeeding pan with a preceding pan arrested against a said gate.